United States Patent [19]

Andrews

[11] Patent Number: 4,693,646

[45] Date of Patent: Sep. 15, 1987

[54] APPARATUS FOR LUBRICATING A WORKPIECE

[75] Inventor: Mark J. Andrews, Niagara Falls, N.Y.

[73] Assignee: Gemcor Engineering Corp., Buffalo, N.Y.

[21] Appl. No.: 829,923

[22] Filed: Feb. 18, 1986

[51] Int. Cl.$^4$ .......................... B23C 1/00; B23B 51/06
[52] U.S. Cl. ........................................ 409/136; 408/59
[58] Field of Search .................. 409/136, 135; 408/59, 408/56, 57; 184/65

[56] References Cited

U.S. PATENT DOCUMENTS

| | | | |
|---|---|---|---|
| 4,095,916 | 6/1978 | Hammond | 409/136 X |
| 4,388,028 | 6/1983 | Bodin | 409/136 |
| 4,515,302 | 5/1985 | Pavern et al. | 29/243.54 |
| 4,557,643 | 12/1985 | Cioci | 409/136 |

FOREIGN PATENT DOCUMENTS

| | | | |
|---|---|---|---|
| 990547 | 6/1976 | Canada | 408/59 |
| 3024585 | 1/1982 | Fed. Rep. of Germany | 408/59 |
| 3401079 | 7/1985 | Fed. Rep. of Germany | 408/59 |
| 878709 | 10/1961 | United Kingdom | 408/59 |
| 464450 | 7/1975 | U.S.S.R. | 408/59 |

Primary Examiner—William R. Briggs
Attorney, Agent, or Firm—Christel, Bean & Linihan

[57] ABSTRACT

A workpiece cutting apparatus including a spindle-supporting assembly, a rotatable spindle mounted within the assembly and a cutting tool supported by the spindle utilizes a network of passages defined in the spindle-supporting assembly, the spindle and cutting tool for effectively introducing a lubricating and/or cooling fluid into the region of a workpiece being cut by the cutting edge of the cutting tool. The spindle-supporting assembly includes a collar having an opening through which a portion of the spindle is rotatably received, and the surface of the opening defines an annular groove encircling the spindle into which fluid is directed. The surfaces of the groove and spindle define an annular cavity, and the spindle defines a passageway defining an opening which is in constant communication with the annular cavity. The cutting tool defines a conduit having an entrance in flow communication with the spindle passageway and an exit positioned adjacent the cutting edge of the cutting tool. Fluid directed into the annular cavity thereby travels a continuous path through the spindle and cutting tool and exits the cutting tool at a location adjacent the cutting edge thereof.

3 Claims, 9 Drawing Figures

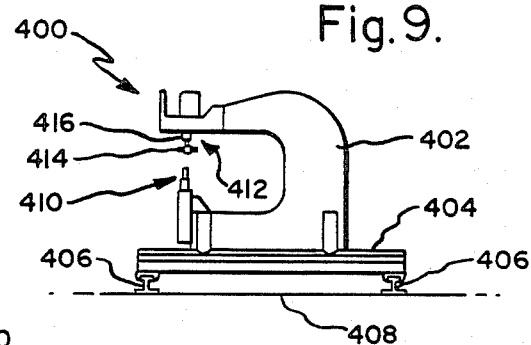
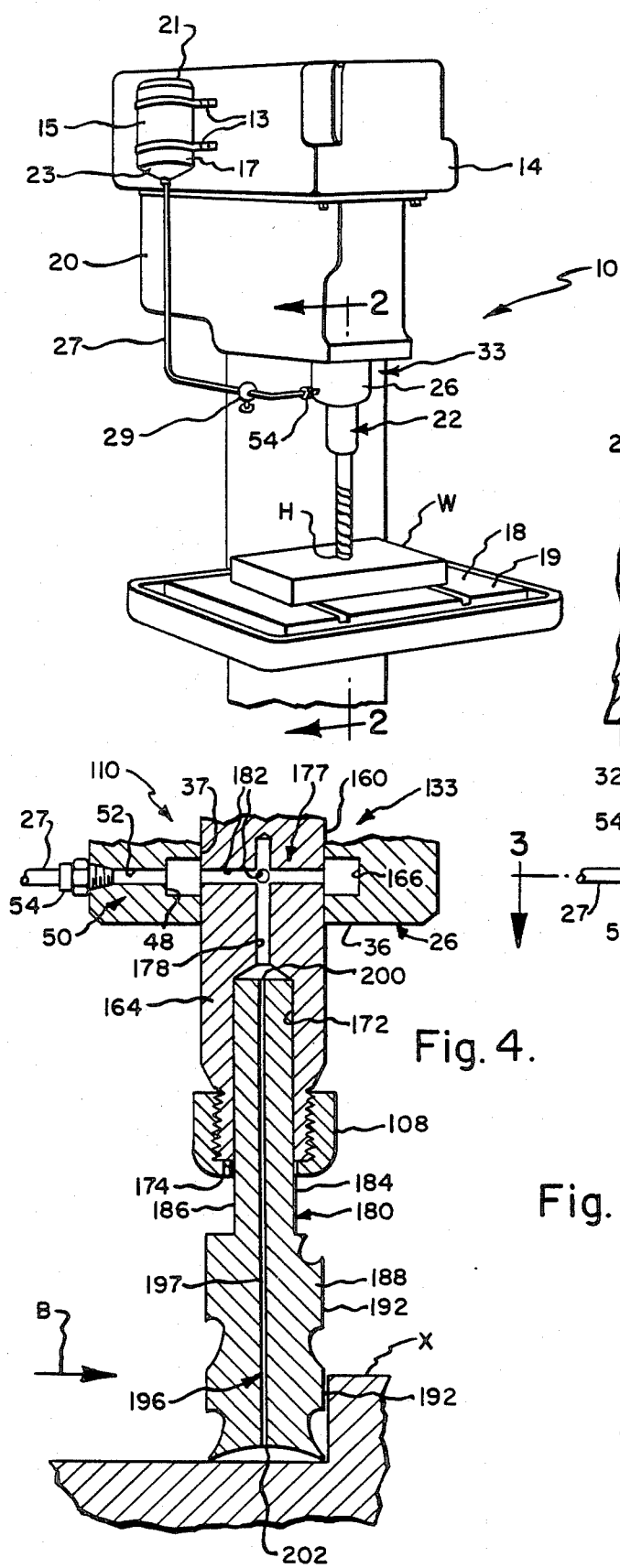
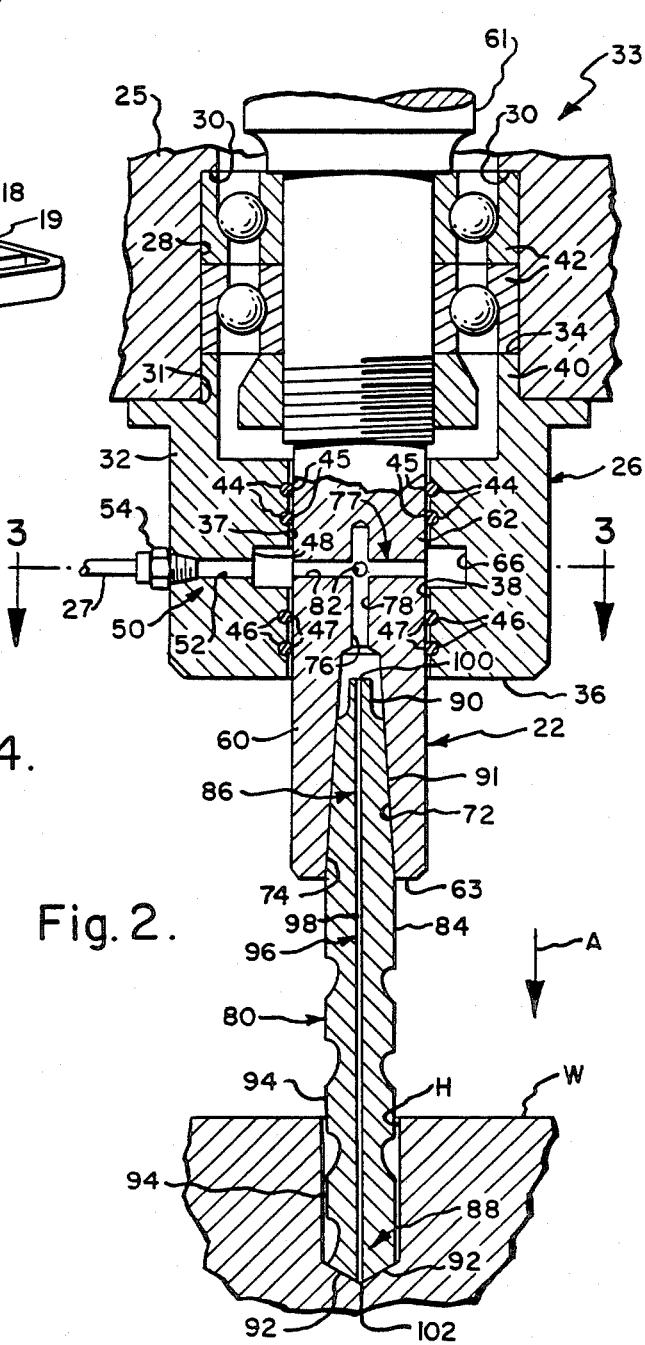

APPARATUS FOR LUBRICATING A WORKPIECE

BACKGROUND OF THE INVENTION

This invention relates generally to the field of machining and relates more particularly to the lubrication and/or cooling of the surface of a workpiece while the workpiece is being cut by a rotating cutting tool. Cutting processes with which this invention is concerned include such processes as drilling, end milling, rotary cutting, countersinking and tapping in which a cutting tool is rotated about a rotational axis and moved in and relative to the workpiece to effect a cutting operation.

It is known that for purposes of lubricating and/or cooling a workpiece during a cutting operation, a suitable fluid such as oil or water can be directed toward the region of engagement between the cutting tool and the workpiece. However, common methods and equipment for directing the fluid toward the aforesaid region of engagement are generally limited in capacity to effectively introduce fluid into the region of the workpiece at which the cutting operation is effected that is, the workpiece region being cut by the cutting edge of the cutting tool. For example, in conventional drilling apparatus utilizing a twist drill for drilling a hole, a lubricating and/or cooling fluid is commonly directed toward the edge or entrance of the hole while the drilling process is underway. However, with the drill rotating within the hole, the directed fluid does not effectively reach the workpiece region (e.g., the bottom of the hole) at which the leading cutting edges of the drill engage the workpiece.

Accordingly, it is an object of the present invention to provide a new and improved apparatus for lubricating and/or cooling a workpiece during a cutting operation with a rotating cutting tool.

Another object of the present invention is to provide such an apparatus for effectively introducing a fluid into the region of engagement between the workpiece and the cutting edges of the cutting tool.

Still another object of the present invention is to provide such an apparatus wherein the pressures required to direct a lubricating and/or cooling fluid between the region of engagement between a workpiece and a cutting tool are relatively low.

Yet still another object of the present invention is to provide such an apparatus which is economical to manufacture and effective in operation.

SUMMARY OF THE INVENTION

This invention resides in an apparatus for cutting a workpiece with a rotating cutting tool and having improved means for lubricating the workpiece during a cutting operation.

The apparatus includes a rotatable cutting tool having a cutting edge, a rotatable spindle in which the cutting tool is supported for rotation therewith, and spindle-supporting assembly including a collar in which the spindle is closely received for rotation relative thereto. The apparatus further includes means defining a network of passageways through the collar, spindle and cutting tool permitting a fluid to be directed into the collar and through the spindle and cutting tool for exiting the cutting tool adjacent the cutting edge thereof. Because fluid exits the cutting tool adjacent the cutting edge, fluid is effectively introduced into the region of the workpiece at which the cutting operation is effected.

BRIEF DESCRIPTION OF THE DRAWING FIGURES

FIG. 1 is a perspective view of an apparatus in which the present invention is embodied.

FIG. 2 is a fragmentary cross-sectional view taken about on line 2—2 of FIG. 1.

FIG. 4 is a fragmentary cross-sectional view illustrating an alternative embodiment of a cutting tool in accordance with the apparatus of the present invention.

FIG. 9 is a side elevational view of an automatic fastening machine provided with the present invention.

DETAILED DESCRIPTION OF ILLUSTRATIVE EMBODIMENTS

Figure 5:
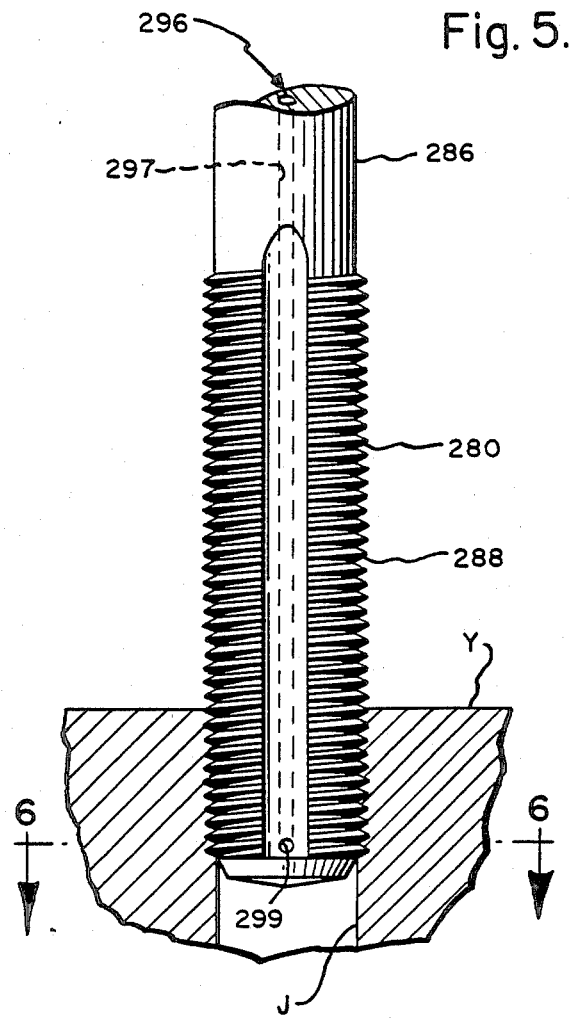
FIG. 5 is a fragmentary view, partially in section, illustrating another embodiment of a cutting tool in accordance with the present invention.

Turning now to the drawings in greater detail and considering first FIG. 1, there is shown an illustrative form of apparatus, generally indicated 10 and in accordance with the present invention, utilized for drilling a hole H in a workpiece W. The apparatus 10 includes a frame structure 12, a cutting head 14 and a reservoir 15 for storing a lubricating fluid. The frame 12 can include a suitable base (not shown) for resting on a floor or suitable supporting surface. A table 18 is held by the frame 12 and includes a support surface 19 for supporting the workpiece W in condition to be worked on by the cutting head 14. The reservoir 15 is mounted upon the cutting head 14 and, as will be explained in greater detail hereinafter, the apparatus 10 further includes means for effectively directing a lubricating fluid from the reservoir 15 into the hole H of the workpiece W as the hole H is being drilled.

The cutting head 14 includes a housing 20 supportedly mounted on the frame 12 and a tool-supporting spindle 22 supported by the housing 20 for rotation relative thereto. A motor (not shown) is mounted within the housing 20 and connected to the spindle 22 for rotating the spindle 22 relative to the housing 20. An appropriate feed mechanisms for example an hydraulic cylinder or rack and pinion arrangement, is suitably connected between the housing 20 and spindle 22 in a manner well known in the art for moving the spindle 22 toward and away from the support surface 19 of the table 18 as the spindle 22 is rotated. Thus, by appropriate operation of the feed mechanism, a cutting tool 80 mounted within the spindle 22 can be moved into and out of engagement with the workpiece W.

By way of further example, the apparatus can be in the form of an automatic drilling and riveting machine wherein the workpiece W is clamped between a lower ram contacting the bottom surface of the workpiece and a hollow pressure foot bushing contacting the top surface of the workpiece and wherein the drill 80 is advanced and retracted through the hollow pressure foot bushing and into and out of workpiece W. For an description of such apparatus, reference may be made to U.S. Pat. No. 4,515,302 issued May 7, 1985 entitled "Riveting Machine".

With reference still to FIG. 1, the reservoir 15 is supportably mounted to one side of the housing 20 with securement straps 13 and includes a fluid receptacle 17 having a removable top lid 21 and a funnel-shaped bottom 23. A tube 27 extends between the bottom 23 of the receptacle and a fitting 54 as shown, and a shut-off valve 29 is mounted in the tube 27. The reservoir 15 is adopted to hold a liquid, such as oil or water, suitable for purposes of lubricating and/or cooling the workpiece W as the hole H is being cut. If necessary, air pressure can be applied to the liquid in reservoir 15 through line 24 in a known manner.

With reference to FIG. 2, the cutting head 14 includes spindle-supporting means 33 having a member 25 and a bearing retainer 26 in the form of a collar attached thereto. The member 25 includes a shouldered through-opening 28 having a shoulder 30 and a lower end 31, as shown. The bearing retainer 26 includes an elongated body 32 defining two opposite ends 34, 36 and a through-opening 38 extending between the ends 34, 36. At one end 34 of the body 32 there is a reduced wall portion 40 received by the lower end 31 of the member through-opening 28, and as shown in FIG. 2, two bearings 42 are retained within the member through-opening 28 between the shoulder 30 and reduced wall portion 40.

The through-opening 38 of the bearing retainer 26 includes a central bore 37 and a first pair of annular grooves 44 defined in the surface of the central bore 37 and longitudinally offset toward the upper portion as viewed in FIG. 2. Grooves 44 receive a corresponding pair of O-rings 45 which sealingly contact the outer surface of the drill spindle in a manner which will be described. Similarly, a second pair of annular grooves 46 is defined in the surface of bore 37 longitudinally offset toward the lower end 36. Grooves 46 receive a pair of O-rings 47 which sealingly contact the outer surface of the drill spindle in a manner which will be described. The surface of central bore 37 also is provided with a relatively larger annular groove 48 located longitudinally generally centrally and between the pairs of grooves 44,46.

Figure 3:
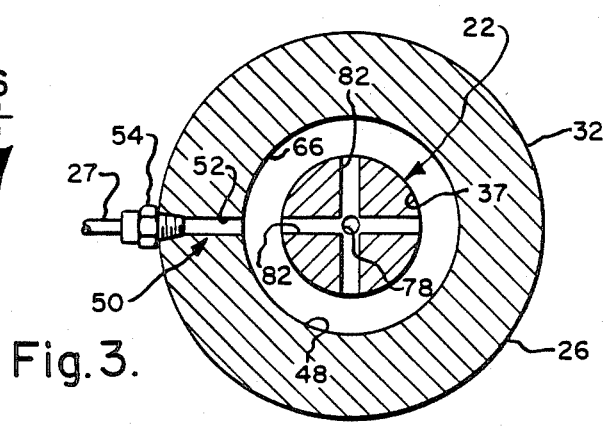
FIG. 3 is a cross-sectional view taken about on line 3—3 of FIG. 2.

With reference to FIGS. 2 and 3, the bearing retainer body 32 also is provided with a flow passage 50 extending between the annular groove 48 and one side of the body 32. The passage 50 is in the form of a bore 52 extending radially from the central bore 37 and is internally-threaded at the side of the body 32 for receiving the fitting 54.

The spindle 22 includes a body 64 having an elongated shank portion 60 defining an upper end 61 and a lower, tool-receiving end 63. The upper end 61 is suitably connected to a drill motor (not shown) for rotating the spindle 22 about its longitudinal axis. Between the upper and lower ends 61,63 of the spindle 22 is defined a cylindrical mid-portion 62 positioned within the bearings 42 and the bearing retainer 26 for rotation relative to the member 24 and bearing retainer body 32. Together, the exterior surface of the spindle mid-portion 62 and the surfaces of the annular groove 48 define an annular cavity 66 encircling the mid-portion 62.

The spindle 22 further defines a tool-receiving cavity 72 extending from the tool-receiving end 63 and axially along the spindle body 64. As shown in FIG. 2, the tool-receiving cavity 72 includes a tapered lower portion 74 of such size and shape to receive a removable cutting tool 80 hereinafter described and an upper portion 76 in the form of an axial bore 78. At least a portion of the axial bore 78 is located radially inwardly of the annular groove 48. Further defined in the spindle body 64 is a passageway 77 including two transverse through-bores 82,82 extending through the center of the spindle body 64 and opening into the annular cavity 66. As best shown in FIG. 3, the transverse through-bores 82,82 intersect the axial bore 78 and open at four locations around the sides of the spindle mid-portion 62 into the annular cavity 66. It will be understood that the openings of the through-bores 82,82 travel an annular path as the spindle body 32 is rotated relative to the bearing retainer 26 so that the through-bores 82,82 open into the annular cavity 66 at every rotational position of the spindle body 32 relative to the bearing retainer 26. Thus, the through-bores 82,82 and the axial bore 78 collectively provide the passageway 77 through which the defined annular cavity 66 communicates with tool-receiving cavity 72.

With reference again to FIG. 2, the cutting tool 80, mentioned above, is in the form of a twist drill and includes a body 84 having a tapered holding portion 86 a tone end and a cutting portion 88 at the other end. The holding portion 86 includes a tang 90 and has a section 91 which is generally complementary in shape to that of the lower portion 74 of the tool-receiving cavity 72. The holding portion 86 is removably positioned within the tool-receiving cavity 72 so that the tool 80 is forced to rotate as the spindle 22 rotates. Inasmuch as the cutting tool 80 is forced axially into the workpiece W while drilling the hole H, the cutting tool 80 is retained within the tool-receiving cavity 72 between the workpiece W and the surface of the cavity 72.

At the lower end of the cutting portion 88 of the tool 80 are defined lips or cutting edges 92,92. Each cutting edge 92 is adapted to effect a cut in the workpiece W as the tool 80 is rotated about and moved into the workpiece W in the direction indicated by the arrow A along the longitudinal axis of the tool 80. Thus, by rotating and moving the tool 80 as aforesaid, the cutting edges 92,92 sever chips from the workpiece W to form the hole H. Spiraling along the sides of the cutting portion 88 are webs 94,94 which transport the severed workpiece chips to the top of the hole H.

With reference still to FIG. 2, the cutting tool 80 defines a conduit 96 in the form of a central bore or passage 98 extending axially along the full length of the tool body 84. The passage 98 defines an entrance 100 located centrally of the tang 90 and an exit 102 located at the end of the tool 80 between and adjacent the cutting edges 92,92.

In a cutting operation performed with the apparatus 10, the cutting tool 80 is rotated relative to the member 25 and the bearing retainer 26 and moved axially into the workpiece W so that the hole H is cut, or drilled, by the cutting edges 92,92 of the cutting tool 80. While the cutting operation is underway, the shut-off valve 29 is opened so that the lubricating and/or cooling fluid stored in the reservoir receptacle 15 is permitted to flow into the bore 52 of the bearing retainer body 32. From the bore 52, the fluid is permitted to travel a continuous path through the annular cavity 66, transverse through-bores 82,82, axial bore 78, tool-receiving cavity and cutting tool conduit 96. The fluid exits the cutting tool 80 through the conduit exit 102 into the bottom of the workpiece hole H. Fluid subsequently exits the hole H through the top of the hole H as a continuous fluid stream is emitted from the conduit exit 102. The two pairs of O-rings 45,47 sealingly contact the outer surface of shank portion 60 of drill spindle 22 and seal in both a lower direction as viewed in FIG. 2 to prevent loss of fluid and in an upper direction to prevent the fluid from entering bearings 42 to prevent the fluid from dissolving the bearing lubricant.

An important advantage of the present invention is that fluid exiting the cutting tool 80 is introduced into the bottom of the hole H at which the cutting edges 92,92 of the cutting tool 80 are in cutting engagement with the workpiece W. At the bottom of the hole H, the fluid migrates between the cutting edges 92,92 and the workpiece W for lubricating purposes and absorbs heat generated during the cutting operation. By introducing fluid to the bottom of hole H during drilling, maximum utilization of the lubricating and cooling properties of the fluid is obtained.

Furthermore, it has been found that in the apparatus 10, very low pressures are required to introduce a continuous stream of lubricating fluid out of the conduit exit 102. That is because fluid is introduced at the end of spindle 22 nearest the collar 26 and through a non-rotating part, i.e. through collar 26. As shown in FIG. 1, the reservoir receptacle 17 is elevated in relation to the bearing retainer 26 so that fluid exiting the receptacle bottom 23 is gravitationally directed through the tube 27. With receptacle 17 elevated as aforedescribed, atmospheric pressure can sufficient to maintain a continuous flow of fluid out of the conduit exit 102. If some additional pressure is needed in line 24, that generally is about 2–5 psi for oil. If, however, air is routed through the passageway network for purposes of cooling the workpiece W, a pressure source producing pressures above atmospheric pressure is believed to be needed.

Introducing fluid at the end of spindle 22 nearest collar 26 and through the non-rotating collar 26 provides the additional advantages of simplicity of structure and ease in manufacture and maintenance.

With reference to FIG. 4, there is shown an alternative embodiment of a cutting apparatus, indicated 110, utilized for end milling a workpiece X. The apparatus 110 includes spindle-supporting means 133, a spindle 122, a collet nut 108 end mill-type cutting tool 180. Components of the spindle-supporting means 133 which corresponds to components of the spindle-supporting means 33 of the apparatus 10 of FIGS. 1–3 are accordingly give the same reference numerals.

The spindle 122 has a body 164 having a tool-receiving end 174 at one end thereof and a cylindrical shank mid-portion 160 spaced from the tool receiving end 174. The end 174 of the spindle 122 is externally-threaded for accepting the collet nut 108. The cylindrical mid-portion 160 is closely received by the through-opening 38 in the bearing retainer 26 so that the surface of the mid-portion 160 defines, with the surface of the groove 46, an annular cavity 166 encircling the mid-portion 160.

The spindle body 164 defines a tool-receiving cavity 172 extending from the tool-receiving end 174 and a passageway 177 communicating between the tool-receiving cavity 172 and the annular cavity 166. The passageway 177 is provided by an axial bore 178 extending from the tool-receiving cavity 172 and two intersecting transverse bores 182,182 extending through the bore 178 so that the through-bores 182,182 open into the annular cavity 166.

The cutting tool 180 has a body 184 including a holding portion 186 in the form of a shank closely received by the tool-receiving cavity 172 and a cutting portion 188 defining cutting edges 192,192, spirally along the sides of the cutting portion 188. The cutting edges 192 are adapted to cut the workpiece X as the tool 180 is rotated about its longitudinal axis and moved relative to the workpiece X in a direction, indicated by the arrow B, generally perpendicular to the rotational axis of the tool 180.

The cutting tool body 184 further defines a conduit 196 extending through the holding portion 186 and the cutting portion 188. The conduit 196 is in the form of an axial bore 197 having an entrance 200 located substantially centrally of the holding portion 186 and an exit 202 located at the bottom of the cutting portion 188.

During a cutting operation with the apparatus 110, a lubricating fluid is directed into the annular cavity 166 by way of the bore 52 and enters the passageway 177 through the openings in the transverse through-bores 182,182. From the passageway 177, fluid enters the entrance 200 of the tool conduit 196 and flows out of the conduit entrance 200 and exits the tool 180 through the conduit exit 202. After exiting the exit 202, the fluid migrates between the cutting edges 192,192 and the surface of the workpiece X being cut.

Figure 6:
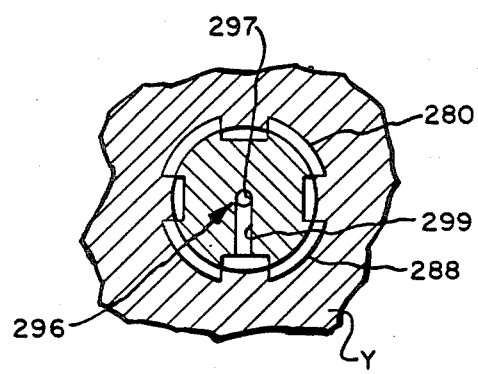
FIG. 6 is a cross-sectional view taken about on line 6—6 of FIG. 5.
Figure 7:
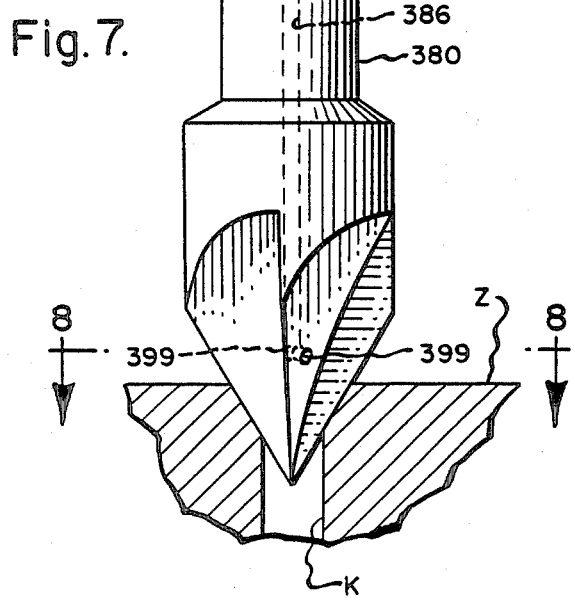
FIG. 7 is a view similar to FIG. 5 illustrating a further embodiment of a cutting tool in accordance with the apparatus of the present invention.
Figure 8:
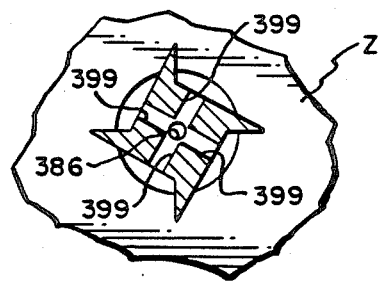
FIG. 8 is a cross-sectional view taken about on line 8—8 of FIG. 6.

It will be understood that numerous modifications may be made to the aforedescribed embodiments without departing from the spirit of the invention. For example, although the cutting tool conduits 96 and 192 of the aforedescribed embodiments 10 and 110 of FIGS. 1–4 have been shown and described as extending axially through and along the cutting tools 80 and 180 from one end of the tool to the other, other arrangements come within the scope of this invention. For example, there is shown in FIGS. 5 and 6, a tapping tool 280 for tapping a hole in a workpiece Y. The tapping tool 280 includes a holding portion 286 and a cutting portion 288 and is provided with a conduit 296 extending through the holding and cutting portions 286,288. One portion, indicated 297, of the conduit 296 is provided by an axial bore extending through the entire holding portion 286 and a substantial distance along the length of the cutting portion 288. Another portion, indicated 299, of the conduit 296 is provided by a radially-extending bore located near the lower end, as shown in FIG. 6, of the tool 280. Furthermore, there is shown in FIGS. 7 and 8 a cutting tool 380 for countersinking a hole K in a workpiece Z. The cutting tool 380 defines a conduit 396 having a bore portion 386 extending axially through the body of the tool 380 as shown and four bores 399,399 extending angularly from the bore portion 386 to locations on the surface of the tool 380 adjacent its cutting edges.

FIG. 9 illustrates an automatic fastening machine 400 in which the drilling apparatus of the present invention can be employed. Machine 400 is an automatic drilling and riveting machine including a generally C-shaped frame 402 movably mounted on a base 404 supported on rails 406 located on a floor or supporring surface 408. Frame 402 carries a lower ram assembly 410 and an upper head 412 including a pressure foot bushing 414 and drilling and riveting tools moveable into and out of alingment with a drilling and riveting axis and movable toward and away from a workpiece clamped between pressure foot bushing 412 and lower ram 410. The drill 416 included in machine 400 is provided with means for lubricating the workpiece during drilling according to the present invention as shown and described in connection with FIGS. 1-3 including spindle 22, support 33, collar 26, drill 80 and the means for defining passageways through the collar 26, spindle 22 and drill 80 permitting fluid to be directed into the collar and drill for exiting the drill adjacent the cutting edge thereof.

It is therefore apparent that the present invention accomplishes its intended objects. While embodiments of the present invention have been described in detail, that is for the purpose of illustration, not limitation.

I claim:

1. In combination with an automatic fastening machine for installing fasteners in a workpiece clamped between an upper head assembly and a lower ram assembly of said machine, apapratus for cutting the workpiece with a rotary cutting tool comprising:
   (a) spindle-supporting means in said upper head assembly and including a collar portion having a body, said collar body defining a through-opening and a flow passage extending through said body to said through-opening, said spindle-supporting means further including a bearing retainer portion extending from said collar portion and having a through opening in communication with said collar through opening;
   (b) a spindle supported by said spindle-supporting means and including a spindle body having a cylindrical shank portion closely positioned within said collar body through-opening and an end portion positioned within said bearing retainer through opening for rotation within and relative to said through-opening about an axis of rotation, the surfaces of said cylindrical shank portion and said collar through-opening defining an annular cavity encircling said cylindrical shank portion, said collar through opening defining an annular groove encircling said cylindrical shank portion so that the surface of said annular groove provides a portion of the walls of said annular cavity, said spindle body defining a tool-receiving end, a tool-receiving cavity extending from said tool-receiving end, and a passageway extending between said tool-receiving cavity and said annular cavity, said spindle body being elongated and adapted to rotate about is longitudinal axis relative to said collar, one portion of said passageway extending axially along said spindle body from said tool receiving cavity and another portion of said passageway extending radially of said one portion to said annular cavity;
   (c) a cutting tool including an elongated body having a cutting portion and a holding portion extending therefrom, said holding portion operatively positioned within said tool-receiving cavity for rotation with said spindle, said cutting portion defining a cutting edge adapted to effect a cut as said cutting tool is rotated and moved into engagement with a workpiece, said tool body having a central passage extending longitudinally therealong, said passage having an entrance in the surface of said holding portion and an exit in the surface of said cutting portion adjacent said cutting edge so that fluid directed into said annular cavity through said flow passage travels a continuous path through said spindle passageway and cutting tool passage and out of said cutting tool at a location adjacent said cutting edge for lubricating the workpiece during a cutting operation;
   (d) bearing means retained in said through opening of said bearing retainer portion of said spindle supporting means for rotatably mounting said spindle in said spindle supporting means;
   (e) first sealing means between said cylindrical shank portion of said spindle body and said collar body adjacent the side of said annular cavity facing said bearing means for preventing fluid from contacting said bearing means; and
   (f) second sealing means between said cylindrical shank portion of said spindle body and said collar body adjacent the opposite side of said annular cavity for preventing loss of said fluid.

2. The apparatus of claim 1 wherein said another portion of said passageway in said spindle body is provided by a through-bore extending through the longitudinal axis of said cylindrical shank portion so that said shank portion passageway is provided with two diametrically opposite openings in communication with said annular cavity.

3. The apparatus of claim 1 wherein said cutting tool is a twist drill and said passage extends axially along said drill from one drill end to the other drill end.

* * * * *